United States Patent
Jurkowski et al.

(10) Patent No.: US 7,589,847 B2
(45) Date of Patent: Sep. 15, 2009

(54) APPARATUS AND METHOD FOR CONVERSION FROM PORTABLE DOCUMENT FORMAT

(75) Inventors: Jason Jurkowski, Milwaukee, WI (US); Simon Barnett, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 868 days.

(21) Appl. No.: 11/185,130

(22) Filed: Jul. 20, 2005

(65) Prior Publication Data

US 2007/0019221 A1    Jan. 25, 2007

(51) Int. Cl.
    *G06F 3/12* (2006.01)
(52) U.S. Cl. ............... 358/1.13; 358/1.14; 358/1.15
(58) Field of Classification Search ............. 358/1.13, 358/1.14, 1.15
    See application file for complete search history.

(56) References Cited

U.S. PATENT DOCUMENTS 6,903,839 B1 * 6/2005 Laverty et al. ............. 358/1.15
2002/0191213 A1 * 12/2002 Laverty et al. ............. 358/1.15
2004/0100656 A1 * 5/2004 Kuroki ...................... 358/1.16
2006/0256358 A1 * 11/2006 Chapman et al. ........... 358/1.13

FOREIGN PATENT DOCUMENTS

EP    1292097 A2 *   3/2003

* cited by examiner

*Primary Examiner*—Twyler L Haskins
*Assistant Examiner*—Jacky X Zheng
(74) *Attorney, Agent, or Firm*—Fay Sharpe LLP

(57) ABSTRACT

An image is identified in a PDF file. The PDF file is converted into a postscript data stream. The identified image is located in the postscript data stream. The located image is segregated from the postscript data stream. The segregated located image is stored separately from a remainder of the postscript data stream. A reference is associated with the separately stored image. The associated reference is inserted into the postscript data stream in place of the separately stored image.

16 Claims, 2 Drawing Sheets

APPARATUS AND METHOD FOR CONVERSION FROM PORTABLE DOCUMENT FORMAT

BACKGROUND

The present exemplary embodiment relates to document processing systems. It finds particular application in conjunction with converting files from Adobe portable document (PDF) to a page description language (PDL) format such as Adobe PostScript. However, it is to be appreciated that the present exemplary embodiment is also amenable to other like applications.

Many different document formats exist for manipulating, processing, and printing documents. These formats range in complexity from a simple text file or html file to a document which uses a page description language to describe its content. One type of format, Adobe's portable document format (PDF), has become quite popular in exchanging documents over the Internet, while another type of format, Adobe's PostScript (PS) format is often used in high-end printers. Many high-end printer models are not capable of processing the PDF data stream directly. Typically, the PDF files are converted into the PS files for processing in the printing system via a PDF to PS converter. However, such conversions present a number of difficulties.

A PDF file is structured like a database. The PDF file contains a number of different pages of information, including various objects such as images. Often images are repeated on different pages throughout the file. To make storage more compact, the PDF file indexes the repeated images to allow fast random access to each image within the PDF file. For each repeated object, a complete set of data for the image is stored at the first occurrence of the image and the image is indexed. At each subsequent occurrence of the image a reference to the indexed original image is created.

A PostScript file, on the other hand, is treated as a stream of data that is interpreted in a linear fashion. The PostScript format provides no mechanism for random access to objects within the PostScript stream of data. Thus, when a PDF file is converted to a PostScript stream, the PDF to PS converter inserts the indexed objects back into the document.

The PDF to PS conversion has few drawbacks. Often, the tags on form objects are lost after conversion. The insertion of the recurring images into the PS file results in substantial size of the resulting converted PostScript document file. Many systems and printers do not accept a PostScript file that is larger than 2 Gb. In addition, the images are processed through the raster image processor (RIP) each time the image appears in the postscript stream. The additional RIP time results in decreased throughput of the document processing system and prevents the images from being cached.

REFERENCES

US Published Application 2004/0100656, to Kuroki, entitled Image processing device, image processing method, program, and computer readable recording medium on which the program is recorded, filed Mar. 12, 2003, describes a PC which transmits a PDF document file after applying conversion processes to a specified object of the objects included in the PDF file in order to reduce the PDF file size when the storage capacity required for printing the PDF file exceeds the usable storage capacity of the printer.

However, the above reference does not describe the system and method for reducing the size of the file converted from a PDF format into a postscript data stream.

BRIEF DESCRIPTION

In accordance with one aspect, a method is disclosed. An image is identified in a PDF file. The PDF file is converted into a postscript data stream. The identified image is located in the postscript data stream. The located image is segregated from the postscript data stream. The segregated located image is stored separately from a remainder of the postscript data stream. A reference is associated with the separately stored image. The associated reference is inserted into the postscript data stream in place of the separately stored image.

In accordance with another aspect, a document processing system is disclosed. A PDF file analyzer analyzes a PDF file and identifies an image in the PDF file. A PDF to postscript converter converts the PDF file into a postscript data stream. An output filter identifies the image in the postscript data stream and segregates the identified image from the postscript data stream. A storage system stores the segregated image and postscript data stream separately from one another. A reference processor associates a reference with the stored image and inserts the associated reference in the postscript data stream.

In accordance with another aspect, a method is disclosed. A PDF file is previewed. Images are identified in the previewed PDF file. The PDF file is converted into a postscript data stream. The identified images are located in the postscript data stream. The located images are one of stored separately from the postscript data stream and cached. A reference or a pointer is associated with the separated images. Associated reference or pointer is inserted into the postscript data stream in place of the separated images.

DETAILED DESCRIPTION

Figure 1:
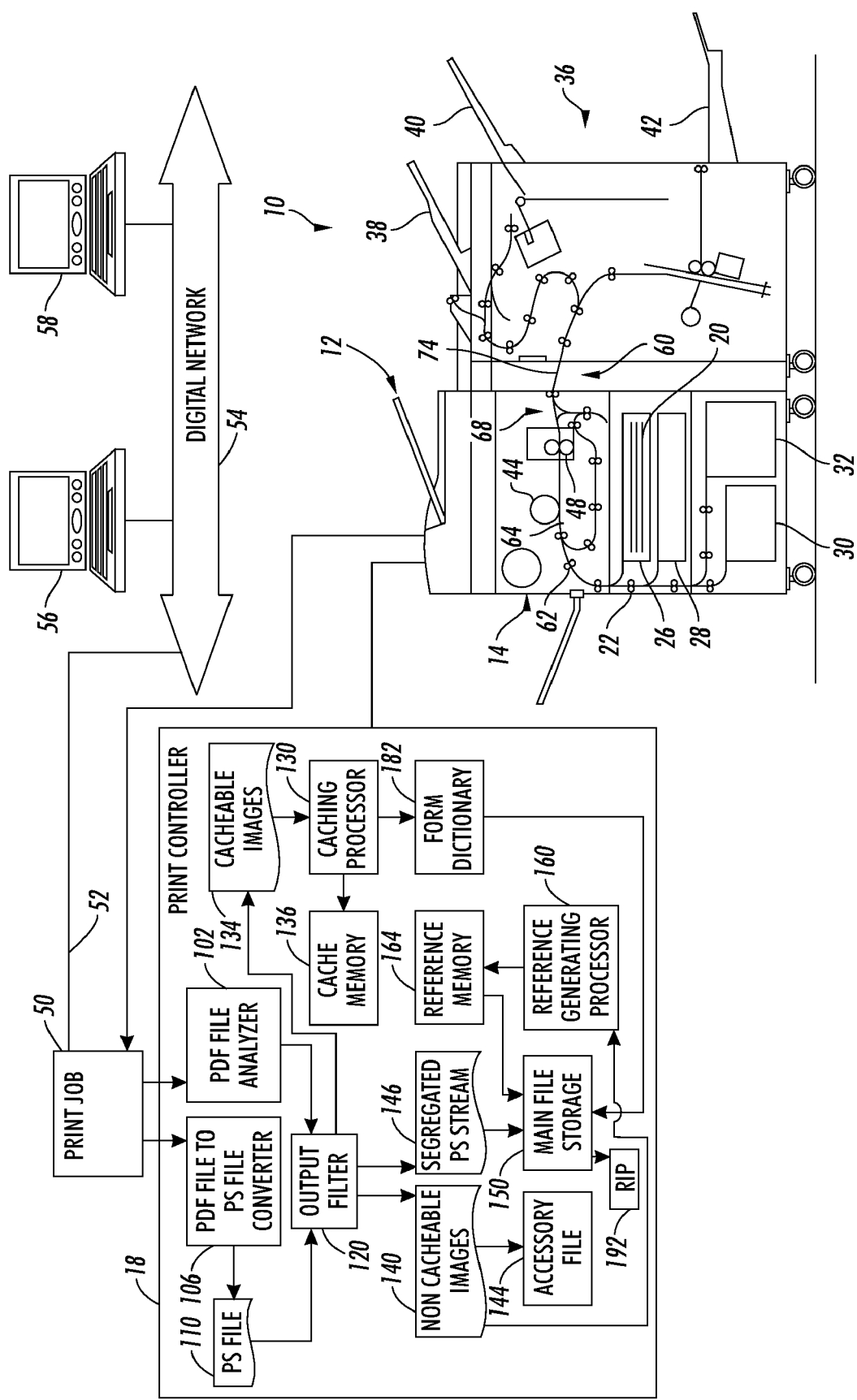
FIG. 1 diagrammatically illustrates a document processing system.

With reference to FIG. 1, a document processing or printing system 10 includes an image input device 12 such as a scanner, a printer such as a printing or marking engine 14, and a system or printer controller 18, all interconnected by links. The links can be wired or wireless links or other means capable of supplying electronic data to and/or from the connected elements. Exemplary links include telephone lines, computer cables, ISDN lines, and the like. The image input device 12 may include conversion electronics for converting the image-bearing documents to image signals or pixels or such function may be assumed by the marking engine 14.

The marking engine 14 is fed with a print media or sheet or sheets 20 from a respective print media feeding source 22 such as a paper feeder including one or more print media sources or paper trays 26, 28, 30, 32. Each of the print media sources 26, 28, 30, 32 can store sheets of the same type of print media, or can store different types of print media. For example, the print media sources 26, 28 may store the same type of large-size paper sheets, print media source 32 may store company letterhead paper, and the print media source 30 may store letter-size paper. The print media can be substantially any type of media upon which the marking engine 14 can print, such as: high quality bond paper, lower quality "copy" paper, overhead transparency sheets, high gloss paper, and so forth. Printed media from the marking engine 14 is delivered to a finisher 36 including one or more finishing output destinations 38, 40, 42 such as trays, stackers, pans, etc. The marking engine 14 includes an imaging component 44 and an associated fuser 48.

In one embodiment, the printing system 10 is a xerographic printing system in which the marking engine 14 includes a photoconductive insulating member which is charged to a uniform potential and exposed to a light image of an original document to be reproduced. The exposure discharges the photoconductive insulating surface in exposed or background areas and creates an electrostatic latent image on the member, which corresponds to the image areas contained within the document. Subsequently, the electrostatic latent image on the photoconductive insulating surface is made visible by developing the image with an imaging material such as a developing powder comprising toner particles. The toner image may subsequently be transferred to the print media, to which the toner image is permanently affixed in the fusing process. In a multicolor electrophotographic process, successive latent images corresponding to different colors are formed on the insulating member and developed with a respective toner of a complementary color. Each single color toner image is successively transferred to the paper sheet in superimposed registration with the prior toner image to create a multi-layered toner image on the paper. The superimposed images may be fused contemporaneously, in a single fusing process. It will be appreciated that other suitable processes for applying an image may be employed.

The fuser 48 receives the imaged print media from the image-forming component and fixes the toner image transferred to the surface of the print media substrate. The fuser 48 employed in the printer 14 can be of any suitable type, and may include fusers which apply heat or both heat and pressure to an image. For example, the fuser may apply one or more of heat or other forms of electromagnetic radiation, pressure, electrostatic charges, and sound waves, to form a copy or print. One suitable fuser includes a pair of rotating rollers spaced to define a nip through which the print media is fed. One of the rollers is heated, while the other roller may serve simply as a means of applying pressure. Other fusing members are also contemplated in place of a pair of rollers, such as belts, sleeves, drumbelts, and the like. Other suitable fusers which may be employed include radiant fusers, which apply a high-intensity flash lamp to the toner and paper.

The printing system 10 executes print jobs. Print job execution involves printing selected text, line graphics, images, machine ink character recognition (MICR) notation, or so forth on front, back, or front and back sides or pages of one or more sheets of paper or other print media. In general, some sheets may be left completely blank. While the illustrated embodiment shows one marking engine 14, it will be appreciated that the printing system 10 may include more than one marking engine, such as two, three, four, six, or eight marking engines. The marking engines may be electrophotographic printers, ink-jet printers, including solid ink printers, and other devices capable of marking an image on a substrate. The marking engines can be of the same print modality (e.g., process color (P), custom color (C), black (K), or magnetic ink character recognition (MICR)) or of different print modalities.

Print job or jobs 50 such as a PDF file can be supplied to the printing system 10 in various ways. The built-in optical scanner 12 can be used to scan a document such as book pages, a stack of printed pages, or so forth, to create a digital image of the scanned document that is reproduced by printing operations performed by the printing system 10. Alternatively, the print jobs 50 can be electronically delivered to the system controller 18 of the printing system 10 via a wired connection 52 from a digital network 54 that interconnects example computers 56, 58 or other digital devices. For example, a network user operating word processing software running on the computer 58 may select to print the word processing document on the printing system 10, thus generating the print job 50, or an external scanner (not shown) connected to the network 54 may provide the print job 50 in electronic form. While the wired network connection 52 is illustrated, a wireless network connection or other wireless communication pathway may be used instead or additionally to connect the printing system 10 with the digital network 54. The digital network 54 can be a local area network such as a wired Ethernet, a wireless local area network (WLAN), the Internet, some combination thereof, or so forth. Moreover, it is contemplated to deliver the print jobs 50 to the printing system 10 in other ways, such as by using an optical disk reader (not illustrated) built into the printing system 10, or using a dedicated computer connected only to the printing system 10.

A print media transporting system or network or highway 60 links the print media source 22, printer 14 and finisher 36. The print media transporting system 60 includes a network of flexible paper pathways that feeds to and collects from each of the printers. The print media transporting system 60 may comprise drive members, such as pairs of rollers 62, spherical nips, air jets, or the like. The system 60 may further include associated motors for the drive members, belts, guide rods, frames, etc. (not shown), which, in combination with the drive members, serve to convey the print media along selected pathways at selected speeds. In the illustrated embodiment, the print media from the source 22 is delivered to the printer 14 by a pathway 64 which is common to the trays 26, 28, 30, 32. The print media is printed by the imaging component 44 and fused by the fuser 48. A pathway 68 from the printer 14 merges into a pathway 74 which conveys the printed media to the finisher 36.

The pathways 64, 68, 74 of the network 60 may include inverters, reverters, interposers, bypass pathways, and the like as known in the art. It will be appreciated that the printer 14 may be configured for duplex or simplex printing and that a single sheet of paper may be marked by two or more of the printers or marked a plurality of times by the same printer, for example, by providing internal duplex pathways.

Figure 2:
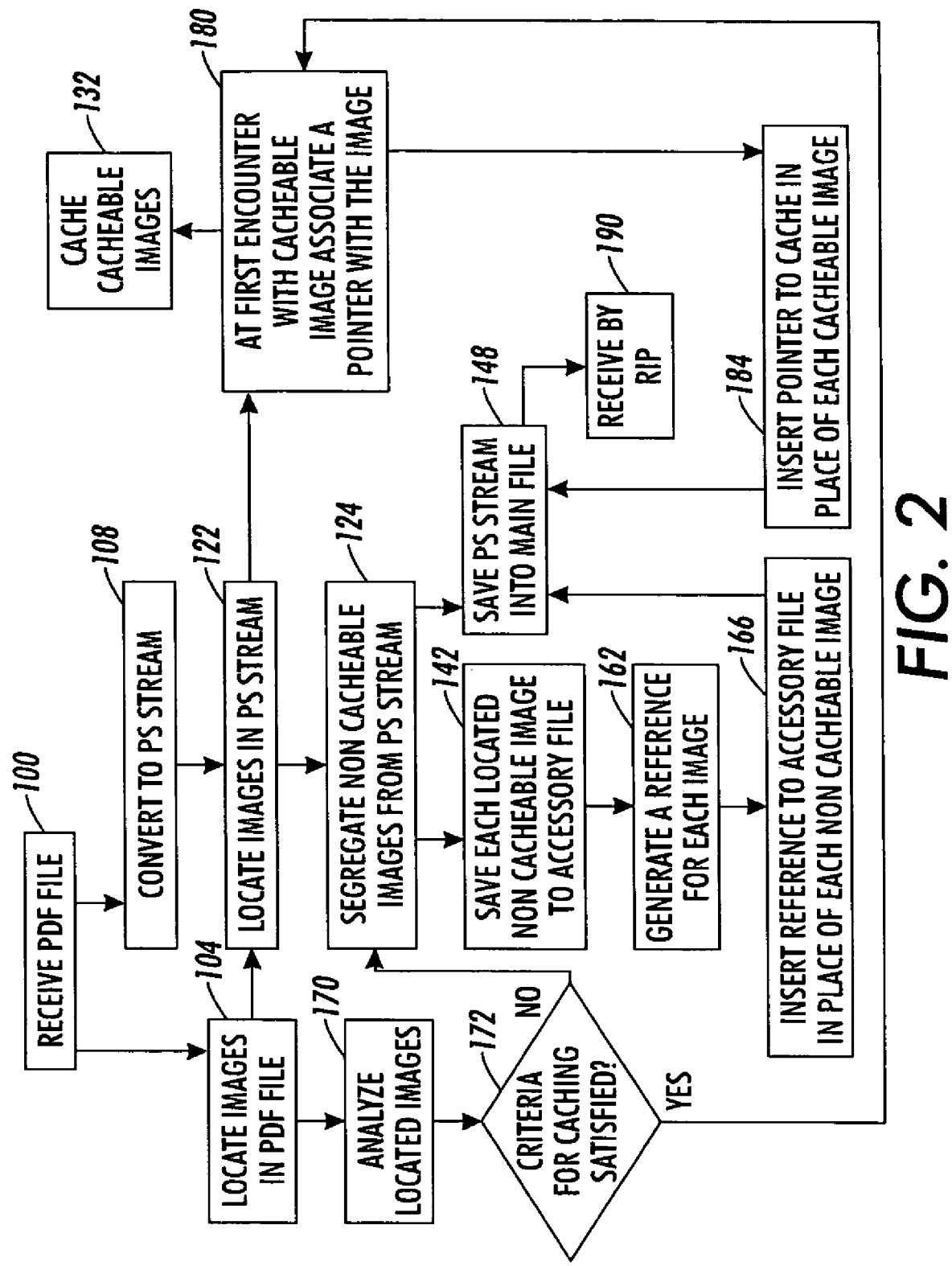
FIG. 2 diagrammatically illustrates a control methodology for processing a PDF document to a postscript file for a use in the system of FIG. 1.

With continuing reference to FIG. 1 and further reference to FIG. 2, the PDF file 50 is received 100 by the document processing system 10. A PDF file analyzer or algorithm 102 scans or previews the PDF file 50 to initially identify and locate 104 images in the PDF file 50 by a use of known algorithms such as, for example, Adobe's PDFL SDK module which traverses the PDF page tree and identifies the images. A PDF file to PS file converter 106 converts 108 the PDF file 50 into a postscript file or postscript stream of data 108. In one embodiment, the PDF file to PS file converter 106 converts 108 the PDF file 50 into a postscript data stream or PS file 110 concurrently with the PDF file analyzer 102 scanning the PDF file 50. An output filter 120 filters the converted PS file 110. More specifically, the output filter 120 locates 122 the initially identified images in the converted postscript stream 110 and segregates 124 the identified images from the converted postscript stream 110. As discussed in detail below, optionally, the output filter 120 determines if one, two, three, or more images are cacheable. A caching processor or algorithm or means 130 caches 132 cacheable images 134 in a cache memory 136. Non cacheable images 140 are saved 142 in an accessory file 144. The postscript stream 146 without images is saved 148 in a postscript stream data main file or main file storage or memory 150. A reference generating processor or algorithm or means 160 generates 162 a reference for each initially encountered image and associates the generated reference with corresponding non cacheable stored image in a reference table or memory 164. The reference indicates at least a position of the image within the PS file. The reference generating processor 160 inserts 166 an associated reference into the postscript stream data main file 150 in place of corresponding removed image. In this manner, the reference to the image, which is stored in the accessory file 144 is inserted into the main file 150 every time the image recurs in the originally converted PS file 110.

With continuing reference to FIGS. 1 and 2, the PDF file analyzer 102 analyzes 170 the images located in the PDF file 50. More specifically, the PDF file analyzer 102 determines one or more aspects of each image of the PDF file 50 to determine whether corresponding image is to be cached into the cache memory 136 or saved in the accessory file 144. In one embodiment, the PDF file analyzer 102 prioritizes the cacheable images to determine the best set of cacheable images to cache with respect to cache usefulness. For example, the PDF file analyzer 102 counts how many times the image recurs in the PDF file 50. Examples of other aspects of the PDF file image is the size of the image, the size of the PDF file, and the like. The PDF file analyzer 102 compares the determined aspect of each image with a threshold $T_H$ which, for example, is prespecified by a user to determine if a criteria for caching is satisfied 172. For example, the threshold $T_H$ can be selected to be equal to 10 image recurrences within the PDF file. If the image recurrence count is greater than the threshold $T_H$, the PDF file analyzer 102 instructs the output filter 120 that the image is cacheable. If the image recurrence count is less than or equal to the threshold $T_H$, the PDF file analyzer 102 instructs the output filter 120 that the image is non cacheable. The caching processor 130 caches 132 the cacheable images 134 in the cache memory 136 and associates 180 pointer with each cached image in a form dictionary 182 at a first encounter with the image in the PS file 110. More specifically, a form is created for each unique cacheable image. Each form includes the information necessary for recreating an associated cached image. For example, the caching processor 130 caches images in Xerox Multimode Compression Technology ("XM2 format"), which is a known XEROX format. The non cacheable images 140 are stored in the accessory file 144 in the manner described above. The caching processor 130 inserts 184 a pointer to an associated cached image into the postscript stream data main file 150 every time the image recurs in the originally converted PS file 110. As described above, the reference generating processor 160 associates a reference with each stored non cacheable image that is stored in the reference memory 164. The reference generating processor 160 inserts 166 an associated reference into the postscript stream data main file 150 in place of corresponding non cacheable image. The reference is inserted once or more times depending on a number of times the non cacheable image recurs in the PDF and PS file. The main PS file 150 processed in the manner described above is received 190 for processing by a raster image processor 192 which produces a print job in a printer readable format.

In this manner, by storing the images externally to the PS data stream, the size of the PS data stream is substantially reduced such that the file size is less than the 2 GB file size limit adopted by many systems and printers. The performance of the PDF print jobs which include recurring images is substantially improved.

In one embodiment, a user is provided with an interactive display. For example, the display includes a first option or selector for the user to turn ON or OFF the PDF file analyzer 102. If the PDF analyzer 102 is turned OFF, the images are not identified in the PDF file and/or PS file to be stored externally. The PDF to PS converter 106 outputs the PS data stream file which includes inserted images. The display further includes a second option or selector for the user to choose to cache or not to cache the images. Only if the "cache" option is selected, the caching processor 130 caches the cacheable images while non cacheable images are stored in the accessory file 144. Otherwise, all identified images are stored externally and references are created.

Although illustrated as a part of the printer controller 18, it is contemplated that the systems and methods described above can be implemented on any computer system such as a network controller, personal computer, and the like.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of a document processing system comprising:
identifying at least one image in a PDF file;
prioritizing the identified image with respect to an aspect of the identified image;
comparing the aspect of the identified image to a threshold of criteria;
converting the PDF file into a postscript data stream;
locating a first encounter of the identified image in the postscript data stream;
associating a reference with the first encountered image in a postscript data stream main file;
creating a memory for each first encountered image including information necessary for recreating such image;
locating a reoccurrence of the identified image in the postscript data stream;
segregating the recurring image from the postscript data stream if the threshold of criteria is not met;
storing the segregated image separately from a remainder of the postscript data stream;
and
inserting the associated reference into the postscript data stream in place of the separately stored image.

2. The method of claim 1, wherein the PDF file includes a recurring image and further including:
inserting the associated reference into the postscript data stream every time the image recurs.

3. The method of claim 2, wherein the aspect is a number of recurrences of the image in the PDF file.

4. The method of claim 3, further including:
comparing the recurrence number with the threshold value; and
prior to the step of storing, caching the identified image if the recurrence number is greater than the threshold value.

5. The method of claim 4, wherein the threshold value is user defined.

6. The method of claim 4, wherein the recurring image is cached in XM2 format.

7. The method of claim 4, wherein the step of caching is actuated by an optional selection for caching images made by a user.

8. A xerographic marking engine, comprising:
a first means for identifying at least one image in a PDF file;

the first means prioritizing the identified image with respect to an aspect of the identified image;

the first means comparing the aspect of the identified image to a threshold of criteria;

a second means for converting the PDF file into a postscript data stream;

a third means for locating a first encounter of the identified image in the postscript data stream;

a fourth means for associating a reference with the first encountered image in a postscript data stream main file;

the fourth means creating a memory for each first encountered image including information necessary for recreating such image;

the second means locating a reoccurrence of the identified image in the postscript data stream;

the second means segregating the recurring image from the postscript data stream if the threshold of criteria is not met;

a fifth means caching the recurring image if the threshold is not met;

a sixth means for storing the segregated image separately from a remainder of the postscript data stream; and a seventh means for inserting the associated reference into the postscript data stream in place of the separately stored image.

9. A document processing system comprising:

a PDF file analyzer for analyzing a PDF file and identifying an image in the PDF file, said analyzer identifies at least one image in a PDF file, prioritizes the identified image with respect to an aspect of the identified image, and compares the aspect to a threshold of criteria;

a PDF to postscript converter for converting the PDF file into a postscript data stream;

an output filter for identifying the image in the postscript data stream and segregating the identified image from the postscript data stream;

a storage system for storing the segregated image and postscript data stream separately from one another if the threshold of criteria is not met; and a reference processor for associating a reference with the stored image and inserting the associated reference in the postscript data stream.

10. The system of claim 9, further including:

a first selector which is selectable by a user for activating the PDF file analyzer.

11. The system of claim 9, wherein the image is a recurring image and wherein the reference processor inserts the associated reference in the postscript data stream each time the image recurs.

12. The system of claim 11, wherein the PDF analyzer counts a number of recurrences of the image in the PDF file.

13. The system of claim 12, further including:

a caching processor or algorithm for caching the recurring image if the recurrence number is greater than the threshold value.

14. The system of claim 13, wherein the threshold value is user defined.

15. The system of claim 13, wherein the caching processor or algorithm caches the recurring image in XM2 format.

16. The system of claim 13, further including:

a second selector which is activated by a user for controlling the caching of the recurring image.

* * * * *